Patented Dec. 15, 1953

2,662,862

UNITED STATES PATENT OFFICE 2,662,862

DRYING RESINS FROM OIL-MODIFIED ALKYDS AND LIQUID POLYBUTADIENE

Willie W. Crouch, Bartlesville, Okla., assignor to Phillips Petroleum Company, a corporation of Delaware No Drawing. Application April 28, 1950,
Serial No. 158,923

10 Claims. (Cl. 260—22)

This invention relates to the manufacture of improved drying alkyd resins. In one embodiment this invention relates to new and novel drying compositions.

Alkyd resins are well-known in the art. These resins are high molecular weight poly esters prepared by the esterification of poly carboxylic acids such as phthalic or maleic acids or their anhydrides, with polyhydric alcohols such as glycerol. These resins are used almost exclusively in the field of protective coatings, and in many of the modern paints and varnishes they are the principal constituent employed as a vehicle.

Pure unmodified alkyd resins are seldom produced, instead, they are usually modified during preparation by a vegetable oil or a mono-basic acid. Depending on the type of modifying agent used, either drying or non-drying alkyd resins can be produced. Thus, cottonseed oil, cocoanut oil, or stearic, lauric, or palmitic acids can be used to produce non-drying alkyd resins, while linseed, soybean, China wood, sun flower, or dehydrated castor oils are typical modifiers for the production of drying alkyd resins.

The drying alkyd resins of the type described have utility as drying ingredients in varnishes and similar coating materials. In such utilization the drying alkyd resin is bodied at high temperatures and subsequently mixed with a resin, thinner and other driers to provide a finished varnish or similar type coating.

This invention is concerned with the improvement of such a drying alkyd resin, to produce an improved drying resin exhibiting drying characteristics superior to those of the original alkyd resin.

An object of this invention is to provide for the manufacture of improved drying alkyd resins.

Another object is to provide for the utilization of a liquid polybutadiene in the production of improved drying alkyd resins.

Another object is to provide for the utilization of a liquid copolymer of 1 3-butadiene in the production of improved drying alkyd resins.

Another object is to provide for the modification of drying alkyd resins to produce drying materials exhibiting drying characteristics superior to those of the original alkyd resin.

Another object is to provide for the interreaction of a liquid polybutadiene with a drying alkyd resin to produce new and improved drying alkyd resins.

Other objects will be apparent to those skilled in the art from the acompanying discussion and disclosure.

In accordance with my invention, a liquid polymer or copolymer of 1,3-butadiene, having characteristics discussed hereafter, is admixed with a drying alkyd resin reactant material of the type described above, or with an alkyd resin base material, i. e. one to be reacted with another material to form the alkyd resin reactant, and the resulting liquid polymer-containing admixture treated at an elevated temperature to form an improved drying alkyd resin as a new and novel composition.

Thus applicant has provided as a new composition, a product of reaction of a drying alkyd resin and a liquid polymer comprising polybutadiene free from solid polymers, having a viscosity at 100° F. within the limits of 100 to 10,000 Saybolt Furol seconds, a molecular weight within the limits of 500 to 4,000, and a specific gravity, 60/60° F., within the limits of 0.85 to 0.95.

The liquid polymeric reactant material is a non-rubber-like resinous polymer free from suspended or dissolved solid polymers, and it has a molecular weight within the limits of 500 to 4,000, and a viscosity generally below about 10,000 Saybolt Furol seconds as measured at 100° F. The non-rubber-like liquid polymer may be a polymer of 1,3-butadiene alone, or a copolymer of 1,3-butadiene with a minor proportion of a monoolefin copolymerizable therewith and containing the group $CH_2=C<$, such as styrene, methyl substituted styrenes, and the like.

The liquid polybutadiene reactant employed in the process of my invention may be produced by any suitable means. It can be prepared by solution polymerization in the presence of a finely divided alkali metal catalyst and a hydrocarbon solvent. In accordance with another procedure the liquid polybutadiene can be prepared by aqueous emulsion polymerization in the presence of relatively large amounts of mercaptan modifiers. In accordance with still another procedure, the liquid polybutadiene can be produced in the presence of hydrofluoric acid as a catalyst.

When employing emulsion polymerization, a sufficiently large amount of modifier is utilized, such as 3 to 10 parts by weight of an alkyl mercaptan, per 100 parts of 1,3-butadiene to provide liquid polybutadiene having the characteristics discussed above.

One method of preparing the liquid polymeric reactant material by solution polymerization is disclosed in my copending application Serial No. 67,098, filed December 23, 1948, now U. S. Patent 2,631,175, issued March 10, 1953. In the procedure referred to in that copending application, 1,3-butadiene of about 98 per cent purity or higher, is polymerized alone, or together with a minor proportion of a monomer copolymerizable therewith, and containing the group $CH_2=C<$, such as styrene, methyl substituted styrenes, and the like, in the presence of a finely divided alkali metal catalyst and a suitable diluent, under carefully controlled reaction conditions, particularly temperature, catalyst condition and concentration, quantity of solvent, and rate of 1,3-butadiene addition. In the preparation of a copolymer, the major polymerizable ingredient is 1,3-butadiene and this component is present in an amount which exceeds 50 weight per cent of the monomeric material. The polybutadiene thus produced is a substantially colorless transparent liquid which is free from dissolved or suspended solid polymers. The viscosity of the liquid polybutadiene is in a large part proportional to the selected particle size of the catalyst, being generally within the limits of from 100 to 5,000, and often from 100 to 2,000 Saybolt Furol seconds, as measured at 100° F. Reaction temperatures employed are generally within the limits of 60 to 110° C. The time required to carry out the polymerization exclusive of the initial induction period, does not generally exceed 8 hours, and is preferably below 4 hours.

When employing hydrofluoric acid as a catalyst, a liquid polybutadiene of the type discussed herein can be prepared by mass polymerization, conducted in an inert solvent, at a temperature within the limits of about −110 to 20° F. This method is discussed in detail in the copending application of J. C. Hillyer and J. F. Wilson, Serial No. 53,995, filed October 11, 1948, now U. S. Patent 2,550,695, issued May 1, 1951.

The manner in which the liquid polymeric butadiene reactant is prepared, is not of primary importance, the more important aspects being its physical and chemical characteristics. I find that in the production of improved drying alkyd resin compositions of my invention those having the most desirable drying characteristics are formed when employing a liquid polybutadiene reactant having a viscosity and molecular weight within the ranges above described, and a specific gravity, 60/60° F., within the limits of 0.85 to 0.95.

Numerous methods are known in the art for the preparation of an alkyd resin employed as a starting material in the process of my invention. In one procedure the drying oil, the polybasic acid or its anhydride, and the polyhydric alcohol are mixed together and interesterified at an elevated temperature in one step. In another procedure the drying oil is first reacted with the polyhydric alcohol in the presence of an ester interchange catalyst to convert a substantial proportion of the drying oil to monoglycerides. The reaction product is then esterified with the polybasic acid or anhydride. Numerous variations of these methods are often utilized in the preparation of these drying alkyd resins. Regardless of the manner in which the drying alkyd resin is prepared, it is reacted with the liquid polymeric butadiene reactant material in accordance with my invention to produce improved drying alkyd resins as new and novel compositions.

In a broad embodiment of my invention the liquid polymeric butadiene reactant is admixed with an alkyd resin reactant from any source, generally after the alkyd resin is formed from a polyhydric alcohol, a drying oil or semi-drying oil, and a poly-basic acid or its anhydride, or by first admixing the polymeric reactant with one of these alkyd resin forming materials, forming the alkyd resin in the presence of the polymeric reactant, and then heating the resulting alkyd resin-polymeric butadiene admixture at a temperature generally within the limits of 450 to 600° F., at which temperatures a chemical combination of the polymeric reactant with the alkyd resin reactant takes place to form an improved drying resin composition of my invention. As compared with the drying alkyd resin reactant, the improved drying resins of my invention exhibit superior bodying times, and varnishes produced from them have superior drying times and form harder films.

In accordance with one embodiment of my invention, I heat a drying oil, such as soybean oil, linseed oil, or the like, with a polyhydric alcohol, preferably a glycerol, in the presence of an ester interchange catalyst, in a weight ratio of oil to glycerol generally within the limits of about 2:1 to 6:1 at a temperature of from 400 to 500° F. for a period of from 0.5 to 5 hours. In this manner an ester interchange takes place to convert a substantial proportion of the drying oil to various monoglycerides of the drying oil acids. The resulting ester-containing reaction mixture is then admixed with a suitable azeotrope-forming material capable of forming an azeotrope with water, such as xylene, toluene, n-heptane, n-octane, benzene, or the like, in an amount described herebelow and in excess of that required for forming an azeotrope with all the water of esterification present, and the resulting admixture is refluxed for a period of from 2 to 10 hours with from 15 to 40 per cent of its weight of a polybasic acid or its anhydride, such as phthalic acid or phthalic anhydride. The temperature of the refluxing liquid is maintained at 350–450° F. by regulating the amount of azeotrope-forming material initially added. Water of esterification is withdrawn overhead from the refluxing mixture as an azeotrope with a portion of the azeotrope-forming material. The residual water-free liquid is a mixture of the remaining azeotrope-forming material and the drying alkyd resin reactant material, to be reacted with the liquid polymeric butadiene.

The residual water-free liquid thus obtained is admixed with from 5 to 60 per cent, preferably from 5 to 50 per cent, of its weight of the liquid polybutadiene reactant, based on its content of alkyd resin, and the resulting admixture is then heated at a temperature within the limits of from about 450 to 600° F. During the heating, the remaining added azeotrope forming material is removed from the residual liquid by distillation. The heating is continued until the viscosity of the residual liquid, free from azeotrope-forming material, and when dissolved in toluene in a volume proportion to toluene of 1:1, i. e. to form a 50 per cent solution, is within the range of from 5 to 60, preferably from 5 to 50 centistokes as measured at 100° F. The residual product thus formed is an improved drying alkyd resin product of my invention.

In the practice of this embodiment I employ sufficient azeotrope-forming material to not only facilitate separation of water of esterification from the refluxing liquid, but also to provide sufficient diluent during the reaction of ester-containing product with the polybasic acid, or its anhydride. If desired, other diluents may be employed, and the amount of azeotrope forming material initially added, decreased accordingly.

In another embodiment of my invention, the polybutadiene reactant is introduced in admixture with the drying or semi-drying oil that is to be reacted with other material to form the alkyd resin reactant, and is present during subsequent alkyd resin-forming steps. Chemical reaction of the polybutadiene reactant with the alkyd resin thus formed, is then effected by heating the resulting mixture of polybutadiene and alkyd resin to the temperature level in the 450 to 600° F. temperature range. In one form of this embodiment, the drying oil or semi-drying oil is admixed with the polybutadiene reactant material, and then heated with glycerol under the conditions described above to effect ester interchange. The resulting ester-containing reaction mixture, containing also the polybutadiene, is then refluxed in the presence of an azeotrope-forming material with the polybasic acid or its anhydride, in the manner described in the foregoing discussed embodiment, to remove water of esterification and to form the alkyd resin reactant. The residual polybutadiene-alkyd resin reactant mixture containing some azeotrope-former is then heated to a temperature within the 450–600° F. range during which time the azeotrope forming material is removed by distillation. The heating is continued until the residual liquid, free of the azeotrope-former, has a viscosity within the limits of 5 to 60 centistokes as measured at 100° F. in 50 per cent toluene solution, as discussed above. The residual product thus formed is an improved drying alkyd resin product of my invention.

The above embodiment can be modified as desired with respect to incorporation of the polybutadiene reactant with any one of the materials to be reacted to form the alkyd resin reactant. For example, if desired, the polyhydric alcohol, the polybasic acid or anhydride, and the drying or semi-drying oil, can be reacted in a single step to form the drying alkyd resin reactant in the presence of the polybutadiene reactant, removing water of esterification from the reaction mixture, and then heating the resulting polybutadiene-alkyd resin mixture at a temperature within the 450–600° F. range, as described above, to form an improved drying alkyd resin product of my invention.

When the polybutadiene reactant is in contact with the drying alkyd resin reactant at temperatures below 450° F., as in the case of the embodiments discussed immediately above, some reaction of polymer with alkyd resin may take place, but at that temperature level the reaction, if any takes place, would be so slow as to be not economically feasible.

If desired, the polybutadiene reactant can be introduced into the alkyd resin-forming step with the polybasic acid or its anhydride. In any case, the polybutadiene reactant is stable to the conditions subjected to, both with respect to reactivity and to decomposition.

Although I have described several preferred embodiments of my invention in terms of a preparative method for forming the alkyd resin, it is to be understood that my invention is not limited thereby, since an alkyd resin reactant material, regardless of its source, can be reacted with the liquid polybutadiene reactant in accordance with the process of my invention.

In the preparation of the drying alkyd resin reactant materials employed in the practice of my invention, polybasic acids particularly applicable include phthalic, succinic, adipic, azelaic, sebacic, itaconic, citraconic, and maleic acids, or their anhydrides; also the so-called "carbic anhydride,"

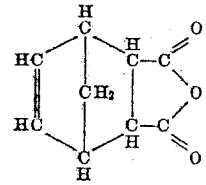

polyhydric alcohols particularly applicable include glycerol, pentaerythritol, sorbitol, mannitol, and erythritol, glycerol being preferred; and drying or semi-drying oils particularly applicable as such, or whose acids or other esters are applicable include soybean, linseed, dehydrated castor, tung, fish, perilla, oiticica, sunflower, walnut, and China wood oils.

Advantages of this invention are illustrated by the following example. The reactants and their proportions and other specific ingredients are presented as being typical and should not be construed to limit the invention unduly.

Liquid polybutadiene was prepared by a sodium catalyzed solution polymerization of 1,3-butadiene in the presence of n-heptane as a solvent, at a polymerization temperature of about 200° F. It had the following properties:

| | |
|---|---|
| Saybolt Furol viscosity, secs. @ 100° F | 435 |
| Color, Gardner | 10 |
| Density, gms./ml. @ 60° F | 0.9092 |
| Refractive index @ 68° F | 1.5200 |
| Molecular weight | 1200, ±200 |
| Ash, weight per cent | 0.013 |
| Unsaturation, per cent [1] | 80 |

[1] Determined by method of Lee et al. in J. Polymer Science III, 66–84 (1948). Procedure III was used. The unsaturation is expressed as per cent of the theoretical unsaturation (one double bond per butadiene unit).

Soybean oil was reacted, in a first step with glycerol, in the presence of calcium naphthenate as an ester interchange catalyst to prepare soybean monoglycerides; the latter was reacted in a second step with phthalic anhydride, using xylene as a water-entraining agent, to effect the esterification; and the resulting resin was reacted further in a third step with the polybutadiene, followed by further heating the resin-polybutadiene to promote an ethlenic cross-linking reaction to produce an improved drying alkyd resin product of my invention.

The charge to the first step was as follows:

| | Parts by weight |
|---|---|
| Soybean oil | 630 |
| Glycerol | 163 |
| Calcium naphthenate (0.01 per cent solution in naphtha) | 39.6 |

This mixture was heated with stirring under nitrogen at 480° F. for two hours to effect ester interchange and produce soybean monoglycerides. There was then added 290 parts by weight of phthalic anhydride and enough xylene to provide a liquid temperature of 400° F. during vigorous refluxing. Heating was continued for seven hours at that temperature, during which time the water produced from the esterification reaction was withdrawn overhead, providing as a drying alkyd resin, a pale yellow, free-flowing liquid residual product having an acid number of 8. Glycerol was used in 35 per cent excess of that required to react with the phthalic anhydride.

The residual pale yellow liquid product thus formed, i. e. the alkyd resin reactant material, was divided into four portions, three of which were admixed with 9, 15, and 24 per cent by weight respectively of the liquid polybutadiene reactant. These three mixtures, along with the fourth portion of the residual product which was employed as a control, were heated at 500° F., allowing the xylene to pass overhead, and holding the liquid product at that temperature until it was found that a 50 volume per cent solution of the heated xylene-free product in toluene, had a viscosity of about 15 centistokes at 100° F. The time at 500° F. required to reach this viscosity was recorded as the bodying time.

Each of the four portions of drying alkyd resin reactant thus treated was used to prepare a varnish, the recipe for which was as follows:

| | Parts by weight |
|---|---|
| Alkyd resin | 40.0 |
| Bodied linseed oil | 4.0 |
| Lead drier | 0.18 |
| Cobalt drier | 0.018 |
| Cleaners' naphtha | 40.0 |

The following tests were performed on the varnish:

1. Drying times

A small glass plate was dipped in the varnish and allowed to stand. The film was considered set dry when gentle pressure of the finger on the film revealed a tacky condition, but none of the film adhered to the finger. The film was rub dry when a finger could be drawn across the film without breaking the film. The final drying time was the time after which all the force that could be expected between thumb and forefinger did not leave a noticeable mark after polishing the film.

2. Hardness tests

Films were applied to plate glass panels by means of a 0.003 inch Bird applicator. After aging 6 days, a comparison of the hardness of the film was made by a Sward hardness rocker.

3. Flexibility tests

Films were brushed on steel plates and bent in a conical mandrel after aging 7 days.

Results of these tests are presented in the tabulation below:

| Alkyd resin—Polybutadiene reaction product | | | Varnish | | | | |
|---|---|---|---|---|---|---|---|
| Polybutadiene weight percent | Bodying time hrs. | Visc. in 1:1 toluene, centistokes | Drying times | | | Hardness by Sward rocker | Mandrel flexibility |
| | | | Set | Rub | Final | | |
| 0 [1] | 18.1 | 15 | 2.0 | 3.3 | >9, <24 | 4 | No breaks. |
| 9 | 12.5 | 15 | 1.3 | 2.0 | >8.5, <24 | 6 | Do. |
| 15 | 11.1 | 16 | 1.0 | 1.8 | >8.5, <24 | 11 | Do. |
| 24 | 6.7 | 17 | 1.3 | 1.8 | >6.5 | 13 | |

[1] Control.

As illustrated, with increasing amounts of polybutadiene (1) a shorter bodying time was obtained, (2) the drying time of the varnish was decreased, and (3) the hardness of the varnish film was increased.

As will be evident to those skilled in the art, various modifications can be made or followed, in the light of the foregoing disclosure and discussion, without departing from the spirit or the scope of the disclosure or from the scope of the claims.

I claim:

1. A process for the production of an improved drying alkyd resin, comprising admixing a drying glyceride oil, modified alkyd resin with from 5 to 60 per cent of its weight of a liquid polymer comprising a polybutadiene free from solid polymers, having a viscosity at 100° F. within the limits of 100 to 10,000 Saybolt Furol seconds, a molecular weight within the limits of 500 to 4,000, and a specific gravity, 60/60° F., within the limits of 0.85 to 0.95, heating the resulting admixture of polymer and drying alkyd resin at a temperature within the limits of 450 and 600° F., whereby said polymer reacts with said alkyd resin to form said improved alkyd drying resin; and recovering said improved alkyd drying resin.

2. A process for producing an improved drying alkyd resin, comprising heating an admixture of a soybean oil and glycerol containing said oil to glycerol in a weight ratio within the limits of 2:1 to 6:1 and containing an amount of a liquid polybutadiene described hereafter at a temperature within the limits of 400 to 500° F., for a period of from 0.5 to 5 hours, in the presence of an ester interchange catalyst, whereby an ester interchange takes place to form soybean monoglycerides; refluxing for a period from 2 to 10 hours the resulting monoglyceride-containing reaction mixture with from 15 to 40 per cent of its weight, exclusive of polybutadiene therein, of phthalic anhydride together with a liquid capable of forming an azeotrope with water and present in the refluxing mixture in an amount sufficient to form an azeotrope with water of esterification therein and to provide a liquid temperature during said refluxing within the limits of 350 to 450° F., withdrawing water of esterification from the refluxing mixture as an azeotrope formed with a portion of said azeotrope-forming liquid, recovering from said refluxing a residual water-free solution of a remaining portion of said azeotrope-forming liquid, a drying alkyd resin and liquid polybutadiene, said amount of polybutadiene above described comprising from 5 to 50 weight per cent of the alkyd resin content of said water-free solution, said liquid polybutadiene introduced into said oil-glycerol admixture being free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95, heating said water-free solution at a temperature within the limits of 450 to 600° F. and during the last said heating distilling all of said remaining portion of azeotrope-forming liquid from said water-free solution, continuing the last said heating until the viscosity of the residual product of said heating is within the limits of from 5 to 60 centistokes as measured at 100° F. in solution with a 1:1 volume proportion of toluene, and recovering said residual product as said improved drying alkyd resin.

3. A process for the production of an improved drying alkyd resin, comprising reacting an alkyd resin formed as a product of condensation of a polyhydric alcohol containing at least 3 hydroxyl groups, a drying oil and a polybasic acid, with from 5 to 60 per cent of its weight of a liquid polybutadiene free from solid polymers, having a viscosity at 100° F. within the limits of 100 to 5,000 Saybolt Furol seconds, a molecular weight within the limits of 500 to 4,000 and a specific gravity, 60/60° F., within the limits of 0.85 to 0.95, at a temperature within the limits of 450 to 600° F., whereby said polybutadiene reacts with said alkyd resin, continuing said heating until the viscosity of the resulting reaction product is within the limits of from 5 to 60 centistokes as measured when in a 50 volume per cent solution in toluene at 100° F., and recovering said reaction product as an improved drying alkyd resin product of the process.

4. A process for the production of an improved drying alkyd resin, comprising admixing a drying alkyd resin comprising the polymeric condensation product of a polyhydric alcohol containing at least three hydroxyl groups, a polybasic acid anhydride, and a semi-drying oil with from 5 to 60 per cent of its weight of a liquid polybutadiene free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95, heating the resulting resin-polybutadiene admixture at a temperature within the limits of 450 to 600° F., whereby said polybutadiene reacts with said alkyd resin, continuing said heating until a viscosity of the resulting reaction product thus heated is within the limits of from 5 to 60 centistokes as measured when in a 50 volume per cent solution in toluene at 100° F., and recovering the reaction product thus heated as said improved drying alkyd resin product of the process.

5. A process for producing an improved drying alkyd resin, comprising heating an admixture of alkyd resin base materials comprising a semi-drying oil, a di-basic acid anhydride and a polyhydric alcohol, and containing liquid polybutadiene free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95, at a temperature within the limits of 350 to 450° F., whereby an alkyd resin is formed and reacts with polybutadiene in said admixture and some polybutadiene remains unreacted, removing water of esterification during said heating, heating the resulting mixture at a temperature within the limits of 450 and 600° F., and recovering as said improved drying resin a product from the last said heating having a viscosity within the limits of 5 to 60 centistokes as measured at 100° F. when in solution with a 1:1 volume proportion of toluene.

6. A process for the production of an improved vegetable oil-modified alkyd resin, comprising admitting a liquid polymer comprising a polybutadiene free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95, into admixture with an alkyd resin base material that is to be reacted at a temperature below 450° F. to form a drying alkyd resin, reacting said material to form said alkyd resin in the presence of said polymer, heating the resulting reaction mixture containing said alkyd resin and polymer at a temperature within the limits of 450 and 600° F., whereby said polymer reacts with said resin, and recovering a reaction product of said heating as said improved drying alkyd resin.

7. As a new composition of matter, a product of condensation of a drying glyceride oil-modified alkyd resin and a liquid polymer comprising polybutadiene free from solid polymers, having a viscosity at 100° F. within the limits of 100 to 10,000 Saybolt Furol seconds, a molecular weight within the limits of 500 to 4,000, and a specific gravity, 60/60° F., within the limits of 0.85 to 0.95.

8. As a new composition of matter, the product of condensation of an alkyd resin formed from a monoglyceride and a di-basic acid anhydride, with from 5 to 60 per cent of its weight of a liquid polybutadiene free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95.

9. As a new composition of matter, the product of condensation of an alkyd resin formed from a soy bean monoglyceride and a phthalic anhydride, with from 5 to 60 per cent of its weight of a liquid polybutadiene free from solid polymers, having a viscosity at 100° F. within the limits of 100 to 5,000 Saybolt Furol seconds, a molecular weight within the limits of 500 to 4,000, and a specific gravity, 60/60° F., within the limits of 0.85 to 0.95.

10. As a new composition of matter, the product of condensation of a drying glyceride oil-modified alkyd resin and from 5 to 60 per cent of its weight of a liquid polymer comprising polybutadiene free from solid polymers, having a viscosity at 100° F. within the limits of 100 to 10,000 Saybolt Furol seconds, a molecular weight within the limits of 500 to 4,000, and a specific gravity 60/60° F., within the limits of 0.85 to 0.95.

WILLIE W. CROUCH.

References Cited in the file of this patent

UNITED STATES PATENTS

| Number | Name | Date |
|---|---|---|
| 2,092,889 | Mikeska et al. | Sept. 14, 1937 |
| 2,264,811 | Rothrock | Dec. 2, 1941 |
| 2,371,652 | Rostler et al. | Mar. 20, 1945 |
| 2,470,953 | Robertson et al. | May 24, 1949 |
| 2,500,983 | Frolich et al. | Mar. 21, 1950 |